(12) United States Patent
Hsiao et al.

(10) Patent No.: US 11,717,801 B2
(45) Date of Patent: Aug. 8, 2023

(54) MICRO-REACTOR AND METHOD OF USE (71) Applicant: Academia Sinica, Taipei (TW)

(72) Inventors: Michael Hsiao, Taipei (TW);
Ming-Che Hsieh, Taipei (TW); Zhen Bao, Changzhou (CN); Ming-Hsien Chan, Taipei (TW); Ru-Shi Liu, Taipei (TW); An-Bang Wang, Taipei (TW); Chia-Chih Chu, Taipei (TW)

(73) Assignee: Academia Sinica, Taipei (TW)

( * ) Notice: Subject to any disclaimer, the term of this patent is extended or adjusted under 35 U.S.C. 154(b) by 31 days.

(21) Appl. No.: 17/625,349

(22) PCT Filed: Aug. 5, 2020

(86) PCT No.: PCT/US2020/044914
§ 371 (c)(1),
(2) Date: Jan. 7, 2022

(87) PCT Pub. No.: WO2021/026176
PCT Pub. Date: Feb. 11, 2021

(65) Prior Publication Data
US 2022/0323925 A1     Oct. 13, 2022

Related U.S. Application Data

(60) Provisional application No. 62/883,106, filed on Aug. 5, 2019.

(51) Int. Cl.
*B01J 19/00* (2006.01)

(52) U.S. Cl.
CPC .. *B01J 19/0093* (2013.01); *B01J 2219/00873* (2013.01); *B01J 2219/00957* (2013.01);
(Continued)

(58) Field of Classification Search
CPC .... B01J 19/00; B01J 19/0093; B01J 2219/00; B01J 2219/00781; B01J 2219/00788; B01J 2219/00792; B01J 2219/00795; B01J 2219/00873; B01J 2219/0095; B01J 2219/00952; B01J 2219/00954; B01J 2219/00957; B01J 2219/00961; B01J 2219/00963; B01J 2219/00968; B01J 2219/0097; B01J 2219/00972; B01J 2219/00975

See application file for complete search history.

(56) References Cited

U.S. PATENT DOCUMENTS

| 7,101,515 | B2 * | 9/2006 | Schwalbe | ............ B01J 19/0093 |
| | | | | 422/62 |
| 11,091,453 | B2 * | 8/2021 | Zikeli | ...................... C08B 1/003 |

FOREIGN PATENT DOCUMENTS

WO    WO-2018115443 A1 *  6/2018  .......... B01J 19/0093

* cited by examiner

*Primary Examiner* — Natasha E Young (57) ABSTRACT

Disclosed herein is a micro-reactor for synthesizing a molecule, for example, compound, a nanoparticle, or a quantum dot. According to embodiments of the present disclosure, the apparatus comprises a processor, a storage unit, a reaction unit, a detector, and a collector, in which the storage unit and the reaction unit are independently controlled by the process. Optionally, the present micro-reactor further comprises a diagnostic device for performing a diagnostic test on a biological sample by use of the molecule. Also disclosed wherein are methods of diagnosing and treating a disease in a subject with the aid of the present micro-reactor.

20 Claims, 6 Drawing Sheets

(52) U.S. Cl.
CPC ............... *B01J 2219/00961* (2013.01); *B01J 2219/00963* (2013.01); *B01J 2219/00972* (2013.01)

MICRO-REACTOR AND METHOD OF USE

CROSS-REFERENCES TO RELATED APPLICATIONS

This application is a U.S. National Stage Filing under 35 U.S.C. 371 from International Patent Application Serial No. PCT/US2020/044914, now WO 2021/026176, filed Aug. 5, 2020, and published on Feb. 11, 2021, which claims the priority of U.S. Ser. No. 62/883,106, filed Aug. 5, 2019, the disclosure of which are incorporated by reference herein in their entireties.

BACKGROUND OF THE INVENTION

1. Field of the Invention

The present disclosure, in general, relates to the field of molecule synthesis. More particularly, the present disclosure relates to a micro-reactor and its use in molecule synthesis, for example, synthesis of compounds, nanoparticles, fluorophores (e.g., quantum dots (ODs)) and the like.

2. Description of Related Art

Chemical synthesis is a process of producing a chemical product via one or more chemical reactions. The reactions are affected by various factors, such as the concentrations of the reactants, types of solvent, the presence of a catalyst, reaction temperature, reaction time, and etc. The synthetic process may be optimized in accordance with intended uses via varying any of the factors described above. It would be ideal if there exists a micro-reactor, which allows the operator to adjust a reaction condition (e.g., adjusting the concentrations of the reactants, the reaction temperature and etc.) in diminutive scale, before proceeding to produce the desired product in full scale continuously in the reactor at the optimal condition. Finding the optimal reaction condition in diminutive scale of a reaction is advantageous in that less reactants (or raw materials) are consumed, and the test-run reaction is completed in a much shorter period of time, which in turn allows early identification of the optimal reaction condition, so that desired end product is produced in a more economical manner, both in time and in expenses.

In view of the foregoing, there exists in the related art a need of an improved method and/or reactor that allows fine-tuning the reaction condition before continuous production of the desired product may be proceed at the optimizing condition.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a micro-reactor for synthesizing a molecule (e.g., a compound, or a fluorophore) detectable by its property (e.g., the mass-to-charge ratio, or the optical property). The micro-reactor of the present disclosure comprises a processor, a storage unit coupled to the processor, a reaction unit coupled to the processor and the storage unit, a detector coupled to the processor and the reaction unit, and a collector disposed downstream to the reaction unit.

According to certain embodiments of the present disclosure, the storage unit comprises two containers, in which the first container is configured to houses a first reagent at a first temperature, and the second container is configured to house a second reagent at a second temperature.

The reaction unit comprises at least one reaction chamber configured to allow the first and second reagents supplied from the storage unit to react at a third temperature and thereby forms a product. According to some embodiments of the present disclosure, the reaction unit comprises two reaction chambers, in which the first reaction chamber is configured to allow the first and second reagents to react at the third temperature and thereby forms an intermediate molecule, and the second reaction chamber is configured to allow the intermediate molecule to react at a fourth temperature and thereby forms the product. According to one specific example, the third temperature is higher than the fourth temperature.

According to the preferred embodiments, each of the reaction chambers comprises a central heater, and a vessel coil disposed around the surface of the central heater, in which one end of the vessel coil is coupled to the storage unit, and the other end of the vessel coil is coupled to the detector. In these embodiments, the vessel coil is configured to accommodate the first and second reagents, and the central heater provides heat energy to the vessel coil so as to allow the first and second reagents to react at proper reaction temperature.

Preferably, the micro-reactor of the present disclosure further comprises at least one thermostat device coupled to the least one reaction chamber.

The detector is configured to detect the property of the product. Depending on desired purposes, the detector may be an optical detector, a chromatography detector, a mass detector, or a combination thereof. According to some examples, the detector is an optical detector for detecting the optical property of the product. In these examples, the optical detector comprises at least one light source configured to excite the product to emit an optical signal, and a detection means configured to detect the optical signal emitted from the product.

According to embodiments of the present disclosure, the storage unit, and reaction unit are independently controlled by the processor. The processor is programmed with instructions to, (1) control the first and second temperatures of the first and second containers, the third and fourth (if any) temperatures of the reaction chambers, and the volumes and flow rates of the first and second reagents provided from the first and second containers; and (2) execute a process for collecting the product in the collector, based on the property of the product detected by the detector. In the case when the property of the product matches with the property of the molecule, then the product is collected as the molecule in the collector. Alternatively, when the property of the product does not match with the property of the molecule, then the volumes and/or flow rates of the first and/or second reagents provided to the reaction unit, and/or the first, second, and/or third temperatures are adjusted until the property of the product matches with the property of the molecule.

According to certain embodiments of the present disclosure, the micro-reactor further comprises a vacuum generator, which is operably coupled to the first or second container so as to create a negative pressure in the first or second container.

According to some embodiments, the micro-reactor further comprises a gas tank configured to provide a sheath gas to the first and second containers. The sheath gas may be nitrogen, argon, helium, or hydrogen. According to one working example, the sheath gas is nitrogen.

According to some working examples, the micro-reactor further comprises a first and a second valves that are respectively coupled to the first and second containers for independently altering the volumes of the sheath gas provided to the first and second containers. In these embodiments, the volumes and/or flow rates of the first and second reagents are independently controlled by the volumes of the sheath gas independently provided to the first and second containers.

Optionally, the micro-reactor of the present disclosure further comprises a first and a second indicators that are respectively coupled to the first and second containers for indicating the volumes of the first and second reagents provided to the reaction unit.

According to certain embodiments of the present disclosure, the micro-reactor further comprises a diagnostic device coupled to the collector. The diagnostic device is useful in performing a diagnostic test on a biological sample by use of the molecule collected in the collector. Depending on desired purposes, the diagnostic device may be employed to perform a polymerase chain reaction (PCR), a reverse transcription polymerase chain reaction (RT-PCT), an enzyme-linked immunosorbent assay (ELISA), an immunofluorescence assay (IFA), or a flow cytometry analysis.

The biological sample may be a whole blood sample, a serum sample, a plasma sample, a urine sample, a saliva sample, a cerebrospinal fluid sample, a sweat sample, a stool extract sample, a synovial fluid sample, a tears sample, a peritoneal fluid sample, or a combination thereof.

Also disclosed herein is a method for diagnosing and treating a disease in the subject by use of the micro-reactor of the present disclosure. The method comprises, (a) obtaining a biological sample from the subject;
(b) mixing the molecule with the biological sample of step (a);
(c) determining the property of the product of step (b);
(d) making the diagnosis based on the result of step (c), wherein a difference of the property of the product of step (b) from that of a control sample indicates that the subject has the disease; and
(e) providing a treatment to the subject based on the diagnosis made in the step (d).

According to preferred embodiments, the control sample is derived from a healthy subject.

The disease may be an inflammatory disease, an infectious disease, an autoimmune disease, a tumor, a degenerative disease, or a cardiovascular disease.

In general, the subject is a mammal; preferably, a human.

Many of the attendant features and advantages of the present disclosure will become better understood with reference to the following detailed description considered in connection with the accompanying drawings.

BRIEF DESCRIPTION OF THE DRAWINGS

The present description will be better understood from the following detailed description read in light of the accompanying drawings, where.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values, and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

As used herein, the term "operably coupled" refers to two components (e.g., the vacuum generator and the container of the present apparatus) are in air communitarian with each other either directly or indirectly thought other intermediate members or components.

The term "valve" as used herein refers to any air regulating the device. For example, the term "valve" can include, without limitation, any device or system that can controllably allow, prevent, or inhibit the flow of air through a passageway (e.g., the conduit of the present micro-reactor). The term "valve" can be a pinch valve, rotary valve, stop cock, pressure valve, shuttle valve, mechanical valve, electrical valve, electro-mechanical flow regulator, or a combination thereof.

The term "diagnosing" refers to methods by which the skilled artisan can estimate and/or determine the probability ("a likelihood") of whether or not a patient is suffering from a given disease or condition. That such a diagnosis is "determined" is not meant to imply that the diagnosis is 100% accurate. Many biomarkers are indicative of multiple conditions. The skilled clinician does not use biomarker results in an informational vacuum, but rather test results are used together with other clinical indicia to arrive at a diagnosis. Thus, a measured biomarker level on one side of a predetermined diagnostic threshold indicates a greater likelihood of the occurrence of disease in the subject relative to a measured level on the other side of the predetermined diagnostic threshold.

The term "treating" or "treatment" encompasses partially or completely preventing, ameliorating, mitigating and/or managing a symptom, a secondary disorder or a condition associated with a disease, for example, an inflammatory disease, an infectious disease, an autoimmune disease, a tumor, a degenerative disease, or a cardiovascular disease. The term "treating" or "treatment" as used herein refers to application or administration of one or more therapeutic agent or surgery to a subject, who has a symptom, a secondary disorder or a condition associated with a disease, with the purpose to partially or completely alleviate, ameliorate, relieve, delay onset of, inhibit progression of, reduce severity of, and/or reduce incidence of one or more symptoms, secondary disorders or features associated with the disease. Treatment may be administered to a subject who exhibits only early signs of such symptoms, disorder, and/or condition for the purpose of decreasing the risk of developing the symptoms, secondary disorders, and/or conditions associated with a disease. Treatment is generally "effective" if one or more symptoms or clinical markers are reduced as that term is defined herein. Alternatively, a treatment is "effective" if the progression of a symptom, disorder or condition is reduced or halted.

The term "subject" refers to a mammal including the human species that is treatable with the micro-reactor and/or method of the present invention. The term "subject" is intended to refer to both the male and female gender unless one gender is specifically indicated.

The term "healthy subject" refers to a subject that does not have a disease (e.g., an inflammatory disease, an infectious disease, an autoimmune disease, a tumor, a degenerative disease, or a cardiovascular disease). For example, a healthy subject has not been diagnosed as having a disease and is not presenting with two or more (e.g., two, three, four or five) symptoms associated with the disease.

The term "biological sample" refers to any sample including tissue samples (such as tissue sections and needle biopsies of a tissue); cell samples (e.g., cytological smears (such as Pap or blood smears) or samples of cells obtained by microdissection); samples of whole organisms (such as samples of yeasts or bacteria); or cell fractions, fragments or organelles (such as obtained by lysing cells and separating the components thereof by centrifugation or otherwise). Other examples of biological samples include whole blood, serum, plasma, urine, saliva, cerebrospinal fluid, sweat, stool extract, synovial fluid, tears, peritoneal fluid, or a combination thereof.

II. Description of the Invention

The present disclosure aims at providing a micro-reactor for synthesizing a molecule, for example, a compound, a nanoparticle, or a fluorophore (e.g., quantum dot (QD)). The micro-reactor of the present disclosure is characterized in that the procedure for synthesizing the molecule is optimized via continuously adjusting the synthetic parameters in accordance with the product until the property (e.g., the optical signal, mass-to-charge ratio, or chromatography) of the product matches with the desired property of the molecule.

Figure 1A:
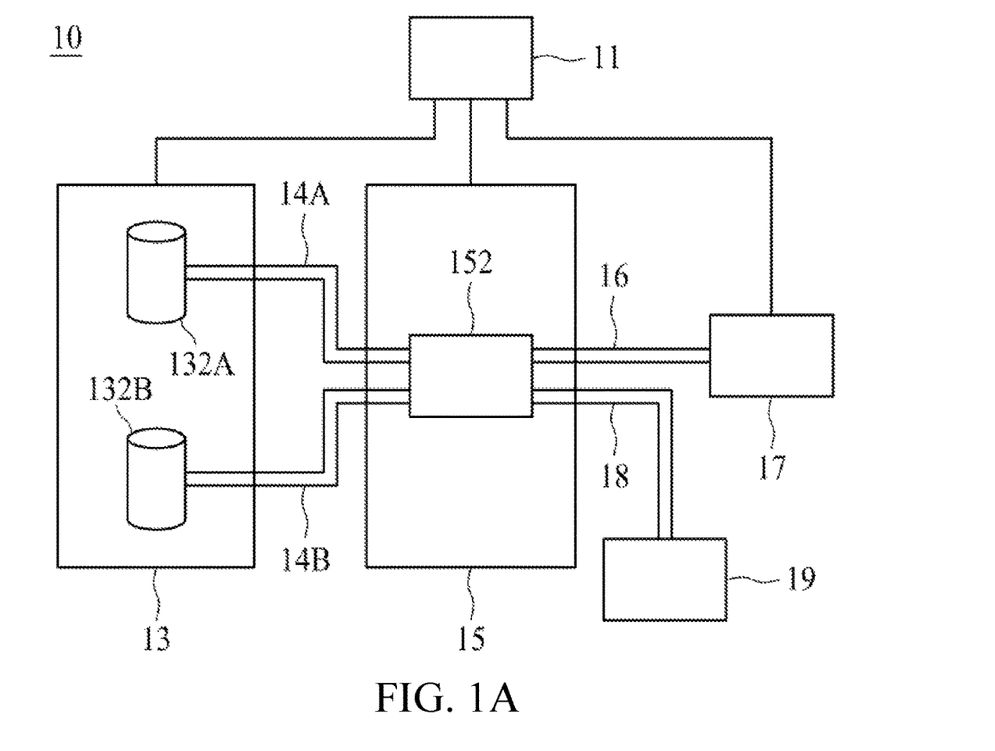
FIG. 1A is a schematic diagram of the present micro-reactor according to one embodiment of the present disclosure.

Reference is now made to FIG. 1A, which is a schematic diagram of the present micro-reactor. As illustrated in FIG. 1A, the micro-reactor 10 comprises a processor 11, a storage unit 13, a reaction unit 15, a detector 17, and a collector 19, in which the storage unit 13, the reaction unit 15, and the detector 17 are respectively coupled to the processor 11. The storage unit 13 comprises a first container 132A and a second container 132B for respectively housing a first reagent at a first temperature, and a second reagent at a second temperature. The reaction unit 15 comprises a reaction chamber 152 coupled to the first and second containers 132A, 132B via conduits 14A, 14B. Accordingly, the first and second reagents may be transferred from the first and second containers 132A, 132B to the reaction chamber 152 through conduits 14A, 14B. The mixture of the first and second reagents then reacts in the reaction chamber 152 at a third temperature thereby forming a product. The first, second, and third temperatures may be the same or different. According to embodiments of the present disclosure, all synthetic parameters are under the control of the processor 11, including the first, second and third temperatures, and the volumes and flow rates of the first and second reagents provided from the first and second containers 132A, 132B.

It should be appreciated that the two containers are exemplified in FIG. 1A to elucidate the present invention; however, the invention is not limited to the exemplary embodiment. The storage unit of the present micro-reactor may comprise more than two (e.g., three, four, five, six, seven, or more) containers for housing the same or different agents in accordance with the intended purposes.

The thus-formed product is transferred via conduit 16 until it reaches the detector 17, where the property of the product is analyzed. The analytic results are then transmitted to and integrated by the processor 11, which executes a process to determine whether the product shall be collected into the collector 19 or not based on the integrated results. Specifically, in the case when the property of the product (e.g., UV spectrum, NMR spectrum and the like) matches with the desired property of the molecule, then the product is collected as the molecule into the collector 19 via the conduit 18. By contrast, when the property of the product does not match with that of the molecule, then one or more parameters, which include but are not limited to, the reaction temperature, the volumes and flow rates of the reagents and etc., are adjusted until matches are found. This step of adjusting parameters may be repeated one or more times until the property of the thus-formed product matches with the desired property of the molecule, then the reaction is allowed to proceed continuously and the thus-formed products are then collected into the collector 19. The one or more parameters that lead to the matches are termed "optimal reaction condition" for the production of the molecule.

Figure 1B:
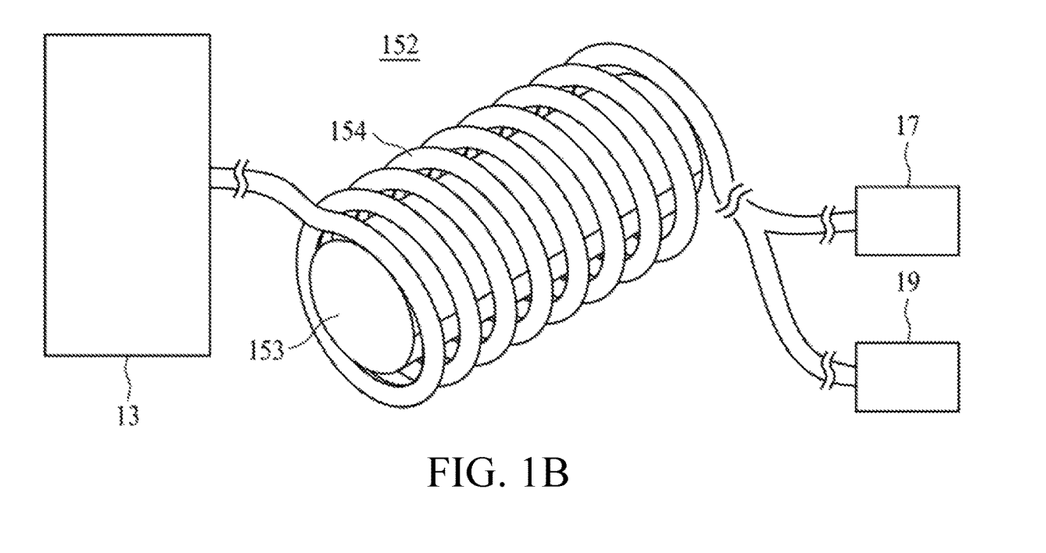
FIG. 1B is a schematic diagram of the reaction chamber of the present micro-reactor according to one embodiment of the present disclosure.

FIG. 1B is a schematic diagram illustrating the structure of the reaction chamber 152 of the micro-reactor 10. The reaction chamber 152 comprises a central heater 153, and a vessel coil 154 disposed around the surface of the central heater 153, in which one end of the vessel coil 154 is coupled to the storage unit 13, and the other end of the vessel coil 154 is coupled to the detector 17 and the collector 19. According to embodiments of the present disclosure, the vessel coil 154 is configured to receive and accommodate the first and second reagents respectively provided from the first and second containers, and the central heater 153 is configured to uniformly heat the vessel coil 154 thereby allowing the first and second reagents to react at the desired temperature (i.e., the third temperature).

The reaction temperature of the reagents in the reaction chamber 152 is controlled by the processor 11 via adjusting the heat energy delivered from the central heater 153 to increase or decrease the temperature.

As to the reaction time, which is the time for the first and second reagents to react and produce the product, it is determined by the period of time both reagents remain in the vessel coil 154; accordingly, the time may be adjusted by the respective flow rates of the first and second reagents passing through the vessel coil 154, as well as by the length of the vessel coil 154.

The detector 17 may be any device that detects the property of the product. For example, an optical detector (e.g., UV-VIS spectrometer) that detects the optical property of the product, a mass detector (e.g., mass spectrometer (MS)) that detects the mass spectrum or mass-to-charge ratio of the product, or a chromatography detector (e.g., high-performance liquid chromatography (HPLC)) that detects the chromatography property of the product. One skilled artisan or clinical practitioner may choose a proper device as the detector of the present micro-reactor in accordance with the desired property of the molecule. According to some embodiments of the present disclosure, the molecule is a fluorophore; accordingly, an optical detector would be ideal for detecting its optical property. In such case, the detector 17 is an optical detector, which comprises a light source configured to excite the product with a light and measure the emitted optical signal therefrom. As would be appreciated, detector 17 may comprise more than one (e.g., two, three, four, or more) light source in accordance with intended uses. In one working example, detector 17 comprises two light source, one of which is an ultraviolet (UV) light source, and the other of which is a halogen light source.

Figure 2A:
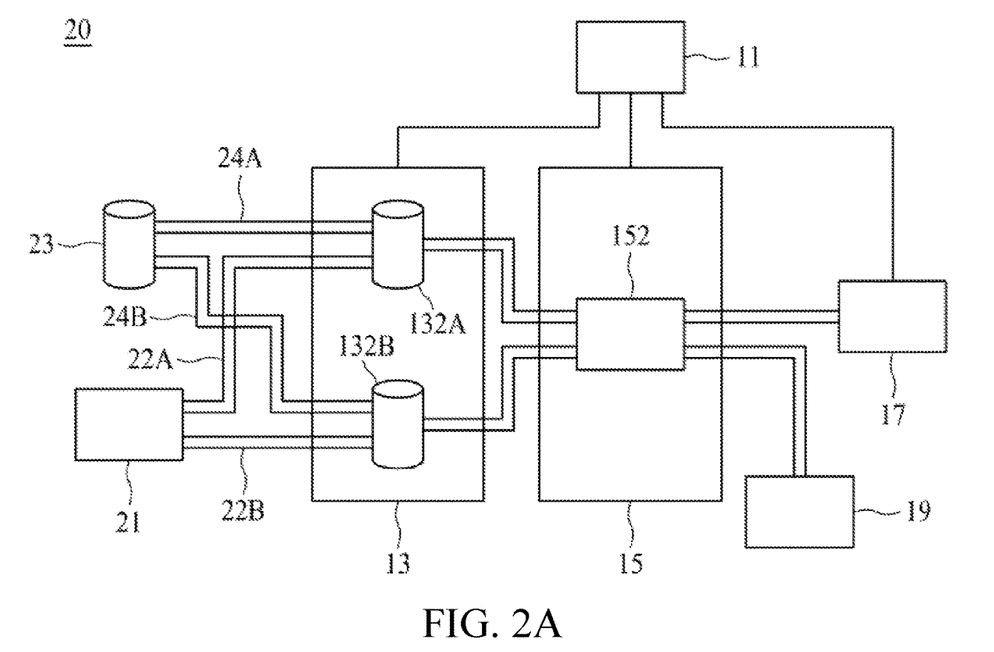
FIGS. 2A and 2B are schematic diagrams of the present micro-reactor according to another embodiment of the present disclosure.

Preferably, the micro-reactor of the present disclosure further comprises a vacuum generator, and a gas tank operably coupled to the first and/or second containers so as to adjust the supply of the first and/or second agents. Reference is now made to FIG. 2A, in which the micro-reactor 20 further comprises a vacuum generator 21 coupled to the first and second containers 132A, 132B via conduits 22A and 22B; and a gas tank 23 coupled to the first and second containers 132A, 132B via conduits 24A, 24B. The vacuum generator 21 is configured to pump the air out of the first and second containers 132A, 132B thereby creating a negative pressure in the first and second containers 132A, 132B. The gas tank 23 then provides a sheath gas to the vacuumed first and second containers 132A, 132B thereby generating a positive pressure to force the first and second reagents respectively out of the first and second containers 132A, 132B and into the reaction chamber 152. Basically, the sheath gas may be any relatively inert gas (e.g., as compared to oxygen), such as nitrogen, argon, helium, or hydrogen. According to one working example of the present disclosure, the sheath gas is nitrogen.

Figure 2B:
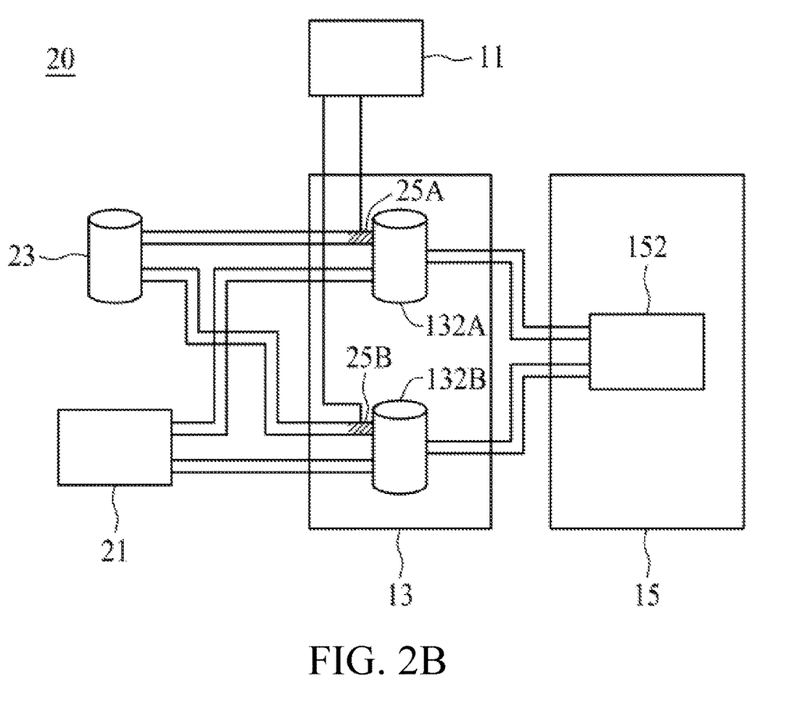

Optionally, the micro-reactor 20 further comprises a first and a second valves 25A, 25B that are disposed of upstream of the first and second containers 132A, 132B, i.e., being disposed between the gas tank 23, and the first and second containers 132A, 132B as depicted in FIG. 2B. The first and second valves 25A, 25B are configured to alter the volumes of the sheath gas provided to the first and/or second containers 132A, 132B, which in turn would alter the volumes and/or flow rates of the first and second reagents provided to the reaction chamber 152. According to certain embodiments of the present disclosure, the first and second valves 25A, 25B are independently controlled by the processor 11.

Alternatively, the first and second valves 25A, 25B may be disposed of downstream of the first and second containers 132A, 132B. For example, the first valves 25A may be disposed between the first container 132A and the reaction chamber 152, and the second valves 25B may be disposed between the second container 132B and the reaction chamber 152. In this way, the volumes and/or flow rates of the first and second reagents provided to the reaction chamber 152 may be adjusted by setting the valves 25A, 25B.

Optionally, the micro-reactor 20 may further comprise a first and a second indicators respectively coupled to the first and second containers 132A, 132B for indicating the volumes of the first and second reagents provided to the reaction chamber 152.

Figure 3A:
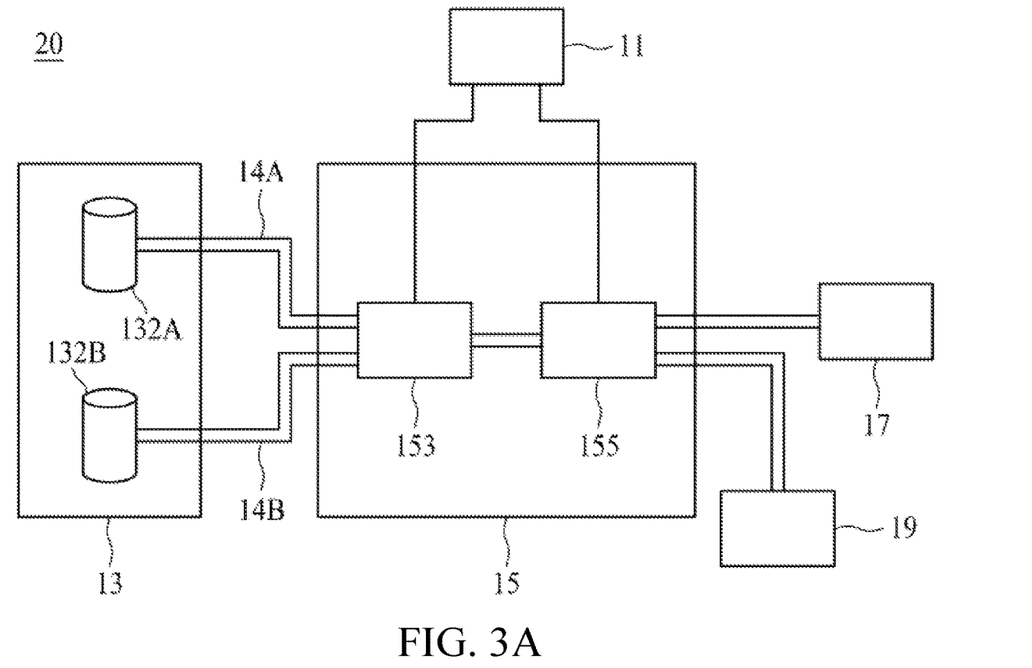
FIG. 3A is a schematic diagram illustrating the present micro-reactor according to another embodiment of the present disclosure.

Depending on desired purposes, the reaction unit of the present disclosure may comprise more than one reaction chamber. Referring to FIG. 3A, which provides an alternative embodiment of the present micro-reactor. The micro-reactor 30 of FIG. 3A is quite similar to the micro-reactor 10 of FIG. 1, except that the reaction unit 15 comprises two reaction chambers 153, 154. In this embodiment, the reaction chamber 153 is configured to receive the first and second reagents provided by the first and second containers 132A, 132B, and allow the first and second reagents to react at a proper temperature (e.g., the third temperature) thereby forming an intermediate molecule; and the reaction chamber 154 is configured to receive the intermediate molecule from the reaction chamber 153, and allow the intermediate molecule to react at another temperature (e.g., a fourth temperature that is different from the third temperature of the reaction chamber 153) so as to form the product. Preferably, the reaction chambers 153, 154 are independently controlled by the processor 11.

Figure 3B:
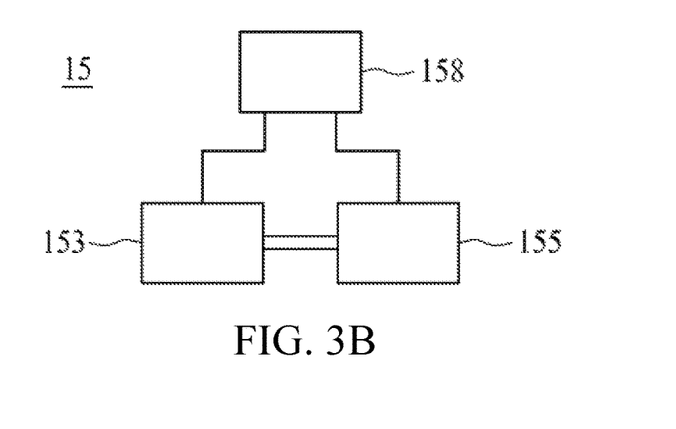
FIGS. 3B-3C are schematic diagrams illustrating the reaction unit of the present micro-reactor according to alternative embodiments of the present disclosure.
Figure 3C:
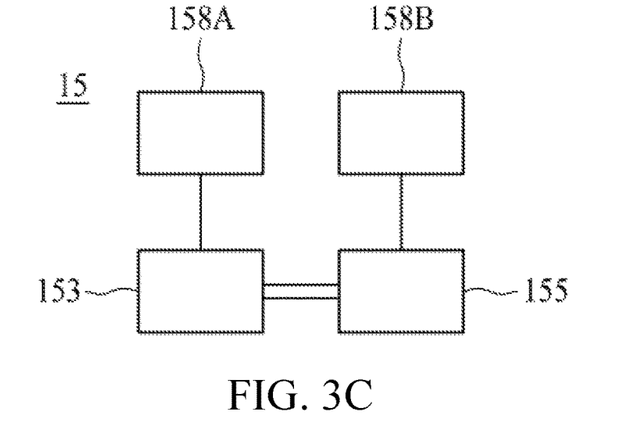

Optionally, in addition to the reaction chamber, the reaction unit of the present disclosure may further comprise one or more (e.g., one, two, three, four, five, or more) thermostats to maintain the temperature of the reaction chamber at the desired set point. Reference is now made to FIG. 3B, in which the reaction unit 15 further comprises a thermostat 158 coupled to the first and second chambers 153, 155. FIG. 3C provides an alternative embodiment of the present reaction unit, in which the reaction unit 15 further comprises two thermostats 158A, 158B that are respectively coupled to the first and second chambers 153, 155.

Figure 4:
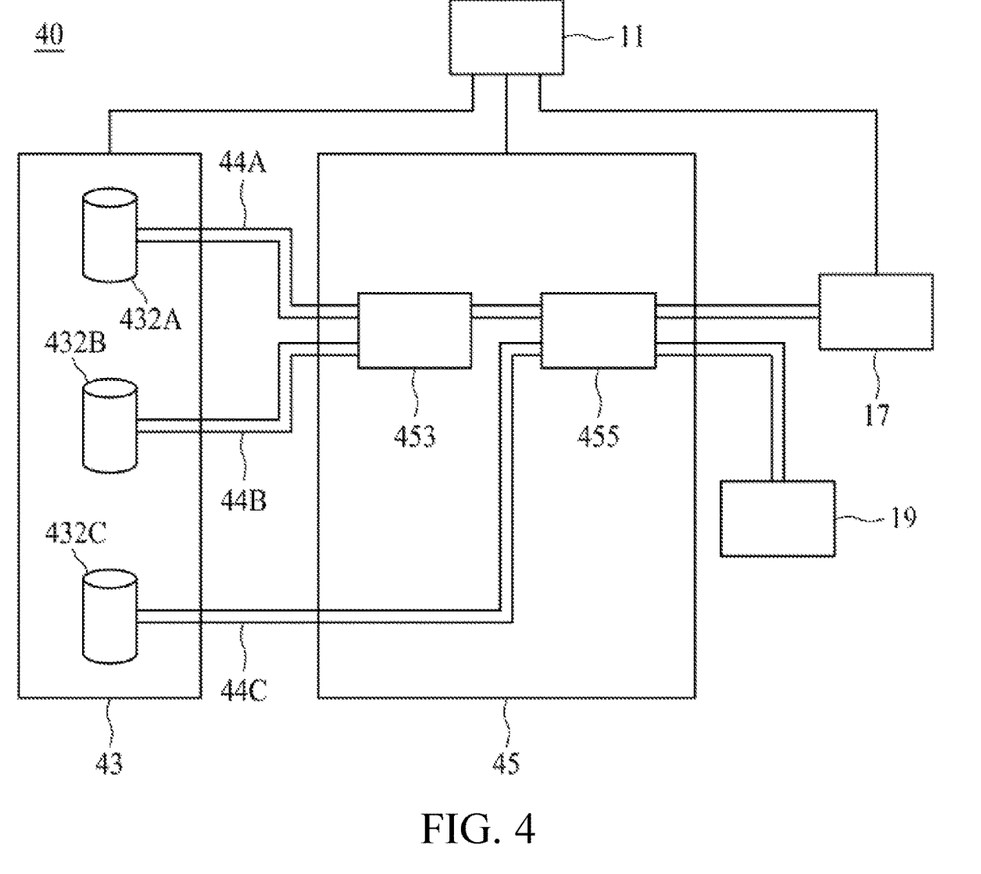
FIG. 4 is a schematic diagram of the present micro-reactor according to one embodiment of the present disclosure.

When the storage unit of the present micro-reactor comprises more than two (e.g., three, four, five, six, or more) containers, each of the containers may be coupled to the same or different reaction chambers. Reference is now made to FIG. 4, in which the storage unit 43 comprises three containers 432A, 432B, 432C for respectively housing a first, a second and a third reagents, and the reaction unit 45 comprises two reaction chambers 453, 455. The containers 432A, 432B are coupled to the reaction chamber 453 via conduits 44A, 44B, and the container 432C is coupled to the reaction chamber 455 via conduit 44C. The micro-reactor 40 is useful in performing a two-step synthesis process, wherein the first and second reagents are mixed and react in the reaction chamber 453 to form an intermediate product, which is then transferred to the reaction chamber 455 followed by mixing and reacting with the third reagent to form the final product.

Figure 5:
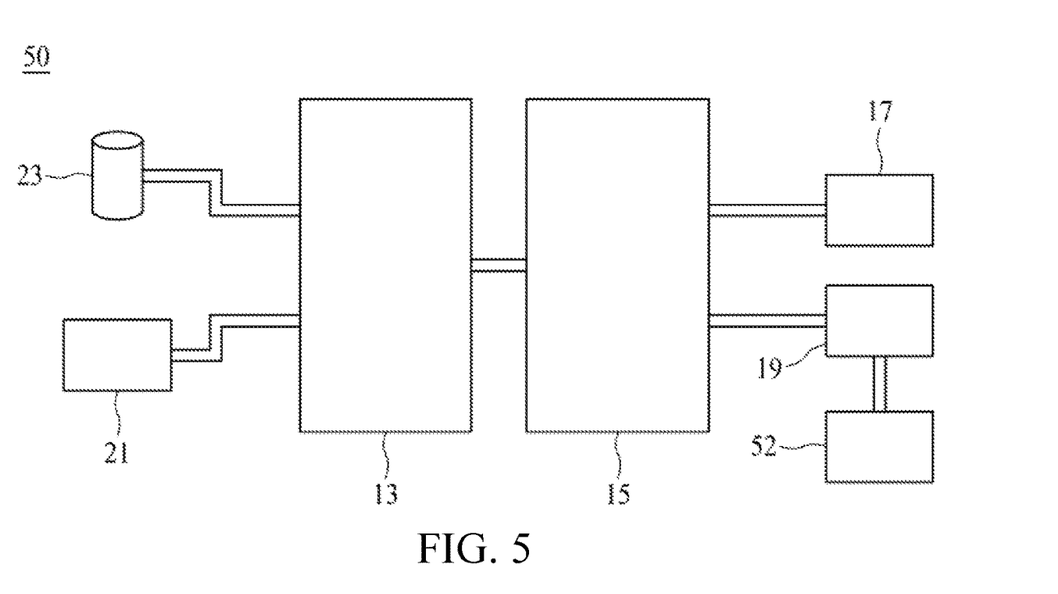
FIG. 5 is a schematic diagram of the present micro-reactor according to another embodiment of the present disclosure.

According to certain embodiments of the present disclosure, the present micro-reactor further comprises a diagnostic device. Referring to FIG. 5, in which the micro-reactor 50 comprises a diagnostic device 52 coupled to the collector 19 so that a diagnostic test on a biological sample may be performed by use of the molecule collected in the collector 19. As would be appreciated, the diagnostic device may vary with desired purposes. For example, the diagnostic device may be used to perform PCR, RT-PCT, ELISA, IFA, or flow cytometry analysis. In one working example, the diagnostic device is in vitro diagnostic (IVD) chip.

Also disclosed therein is a method for diagnosing and treating a disease in the subject by use of the present micro-reactor. The method comprises, (a) obtaining a biological sample from the subject;
(b) mixing the molecule with the biological sample of step (a);
(c) determining the property of the product of step (b);
(d) making the diagnosis based on the result of step (c), wherein a difference of the property of the product of step (b) from that of a control sample indicates that the subject has the disease; and
(e) providing a treatment to the subject based on the diagnosis made in the step (d).

In step (a), a biological sample is first obtained or isolated from the subject. The biological sample may be any of a whole blood sample, a serum sample, a plasma sample, a urine sample, a saliva sample, a cerebrospinal fluid sample, a sweat sample, a stool extract sample, a synovial fluid sample, a tears sample, a peritoneal fluid sample, or a combination thereof. The subject is a mammal, for example, a rat, a hamster, a guinea pig, a rabbit, a dog, a cat, a cow, a goat, a sheep, a monkey, and a horse. Preferably, the subject is a human.

Then, in step (b), the molecule synthesized by the present micro-reactor is mixing with the biological sample followed by subjecting to the diagnostic device of the present micro-reactor. The property (e.g., the optical signal, mass-to-charge ratio, or chromatography) of the mixture of step (b) is determined by the diagnostic device as described in step (c).

Based on the result of step (c), one skilled artisan or a clinical practitioner may make a diagnosis of whether or not the subject suffers from a disease, for example, an inflammatory disease, an infectious disease, an autoimmune disease, a tumor, a degenerative disease, or a cardiovascular disease. Specifically, in the case when the property of the mixture of step (b) is different from the property of a control sample (e.g., a mixture of the present molecule and a biological sample derived from a healthy subject), then the subject suffers from the disease.

Once the subject is diagnosed with the disease, a proper treatment (e.g., an anti-inflammatory agent, an anti-pathogen agent, an immunomodulatory agent, an anti-cancer agent, an anti-oxidant, an anti-aging agent, an anti-thrombotic agent, or a surgery) is administered to the subject so as to alleviate or ameliorate the symptom associated with the disease (step (e)).

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

EXAMPLE

Preparation of QDs

In the preparation of InP/ZnSeS/ZnS QDs, the storage unit of the micro-reactor comprises two containers. The first container included an octadecene solution containing 30 mM $In(AC)_3$, 160 mM myristic acid, and 30 mM $Zn(St)_2$, and was set at a temperature of 120° C. The second container included a $P(TMS)_3$ solution (400 mM, dissolved in octadecene), and was set at room temperature. Nitrogen was employed as the sheath gas to force the octadecene solution and the $P(TMS)_3$ solution into a first reaction chamber. The reaction was carried out at 260° C. for 40 minutes to form an intermediate product, which was then transferred to a second reaction chamber, and reacted at 250° C. for 60 minutes so as to obtain the final product.

Figure 6:
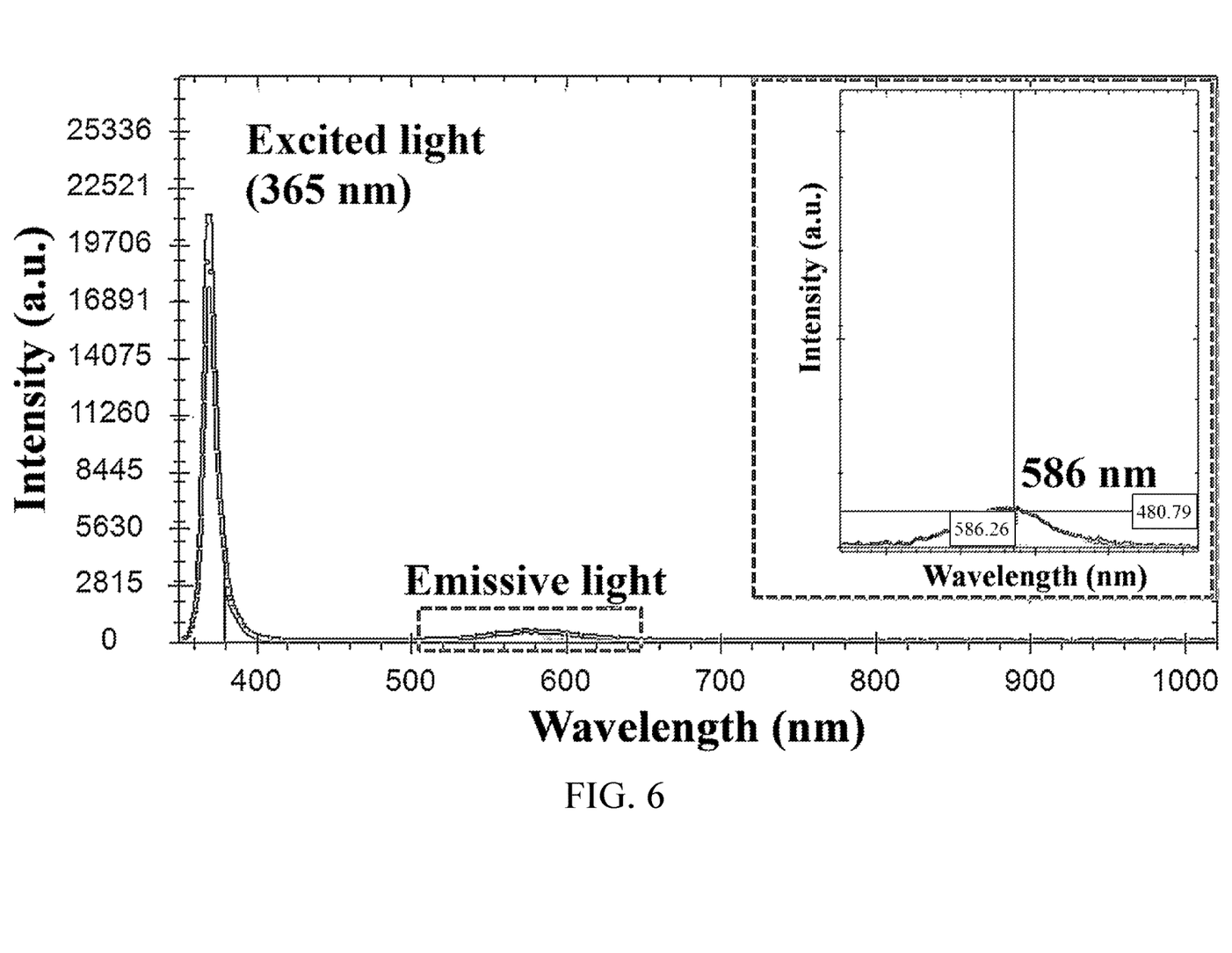
FIG. 6 is the analytic result of a spectrometer according to Example of the present disclosure.

A halogen light source and a UV light source were used to excite the product to emit an optical signal. The optical signal was detected by a spectrometer, and the result was illustrated in FIG. 6. Based on the detected signal, one skilled artisan may adjust one or more synthetic parameters (e.g., the volumes and/or flow rates of the octadecene and $P(TMS)_3$ solutions, and/or the reaction temperature) to alter the optical signal of the product until it matches with the optical signal of the InP/ZnSeS/ZnS QDs.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A micro-reactor for synthesizing a molecule detectable by its property, comprising,
   (a) a processor;
   (b) a storage unit coupled to the processor, comprising,
      a first container configured to house a first reagent at a first temperature; and
      a second container configured to house a second reagent at a second temperature;
   (c) a reaction unit coupled to the processor and the storage unit, wherein the reaction unit comprises,
      at least one reaction chamber configured to allow the first and second reagents supplied from the storage unit to react at a third temperature and thereby forms a product;
   (d) a detector coupled to the processor and the reaction unit for detecting the property of the product; and
   (e) a collector disposed downstream to the reaction unit for collecting the product;
   wherein,
      the storage unit and reaction unit are independently controlled by the process; and
      the processor is programmed with instructions to,
         control the first and second temperatures of the first and second containers, the third temperature of the reaction chamber, and the volumes and flow rates of the first and second reagents provided from the first and second containers;
         execute a process for collecting the product in the collector, based on the property of the product detected by the detector;
         when the property of the product matches with the property of the molecule, then collecting the product as the molecule in the collector; or
         when the property of the product does not match with the property of the molecule, then adjusting the volumes and/or flow rates of the first and/or second reagents provided to the reaction unit, and/or adjusting the first, second, and/or third temperatures until the property of the product matches with the property of the molecule.

2. The micro-reactor of claim 1, further comprising a vacuum generator operably coupled to the first or second container to create a negative pressure in the first or second container.

3. The micro-reactor of claim 2, further comprising a gas tank configured to provide a sheath gas to the first and second containers.

4. The micro-reactor of claim 3, wherein the sheath gas is nitrogen, argon, helium, or hydrogen.

5. The micro-reactor of claim 4, wherein the sheath gas is the nitrogen.

6. The micro-reactor of claim 3, further comprising a first and a second valves respectively coupled to the first and second containers for independently altering the volumes of the sheath gas provided to the first and second containers.

7. The micro-reactor of claim 6, wherein the volumes and/or flow rates of the first and second reagents are independently controlled by the volumes of the sheath gas independently provided to the first and second containers.

8. The micro-reactor of claim 1, wherein the reaction unit comprises a first and a second reaction chambers, wherein the first reaction chamber is configured to allow the first and second reagents to react at the third temperature and thereby forms an intermediate molecule; and the second reaction chamber is configured to allow the intermediate molecule to react at a fourth temperature and thereby forms the product, wherein the fourth temperature is controlled by the processor.

9. The micro-reactor of claim 8, wherein the third temperature is higher than the fourth temperature.

10. The micro-reactor of claim 1, wherein each of the least one reaction chamber comprises a central heater, and a vessel coil that is disposed around the surface of the central heater for accommodating the first and second reagents, wherein one end of the vessel coil is coupled to the storage unit, and the other end of the vessel coil is coupled to the detector.

11. The micro-reactor of claim 1, further comprising at least one thermostat device coupled to the least one reaction chamber.

12. The micro-reactor of claim 1, further comprising a first and a second indicators respectively coupled to the first and second containers for indicating the volumes of the first and second reagents provided to the reaction unit.

13. The micro-reactor of claim 1, further comprising a diagnostic device coupled to the collector, and configured to perform a diagnostic test on a biological sample by use of the molecule.

14. The micro-reactor of claim 13, wherein the diagnostic device is configured to perform a polymerase chain reaction (PCR), a reverse transcription polymerase chain reaction (RT-PCT), an enzyme-linked immunosorbent assay (ELISA), an immunofluorescence assay (IFA), or a flow cytometry analysis.

15. The micro-reactor of claim 13, wherein the biological sample is a whole blood sample, a serum sample, a plasma sample, a urine sample, a saliva sample, a cerebrospinal fluid sample, a sweat sample, a stool extract sample, a synovial fluid sample, a tears sample, a peritoneal fluid sample, or a combination thereof.

16. The micro-reactor of claim 1, wherein the detector is an optical detector, a chromatography detector, a mass detector, or a combination thereof.

17. The micro-reactor of claim 16, wherein the molecule is a fluorophore, and the detector is the optical detector for detecting the optical property of the product, wherein the optical detector comprises,
   at least one light source configured to excite the product to emit an optical signal; and
   a detection means configured to detect the optical signal emitted from the product.

18. A method for diagnosing and treating a disease in the subject by use of the micro-reactor of claim 13, comprising,
   (a) obtaining a biological sample from the subject;
   (b) mixing the molecule with the biological sample of step (a);
   (c) determining the property of the product of step (b);
   (d) making the diagnosis based on the result of the step (c), wherein a difference of the property of the product of step (b) from that of a control sample indicates that the subject has the disease; and
   (e) providing a treatment to the subject based on the diagnosis made in the step (d).

19. The method of claim 18, wherein the control sample is derived from a healthy subject.

20. The method of claim 18, wherein the disease is an inflammatory disease, an infectious disease, an autoimmune disease, a tumor, a degenerative disease, or a cardiovascular disease.

* * * * *